Patented Aug. 16, 1932

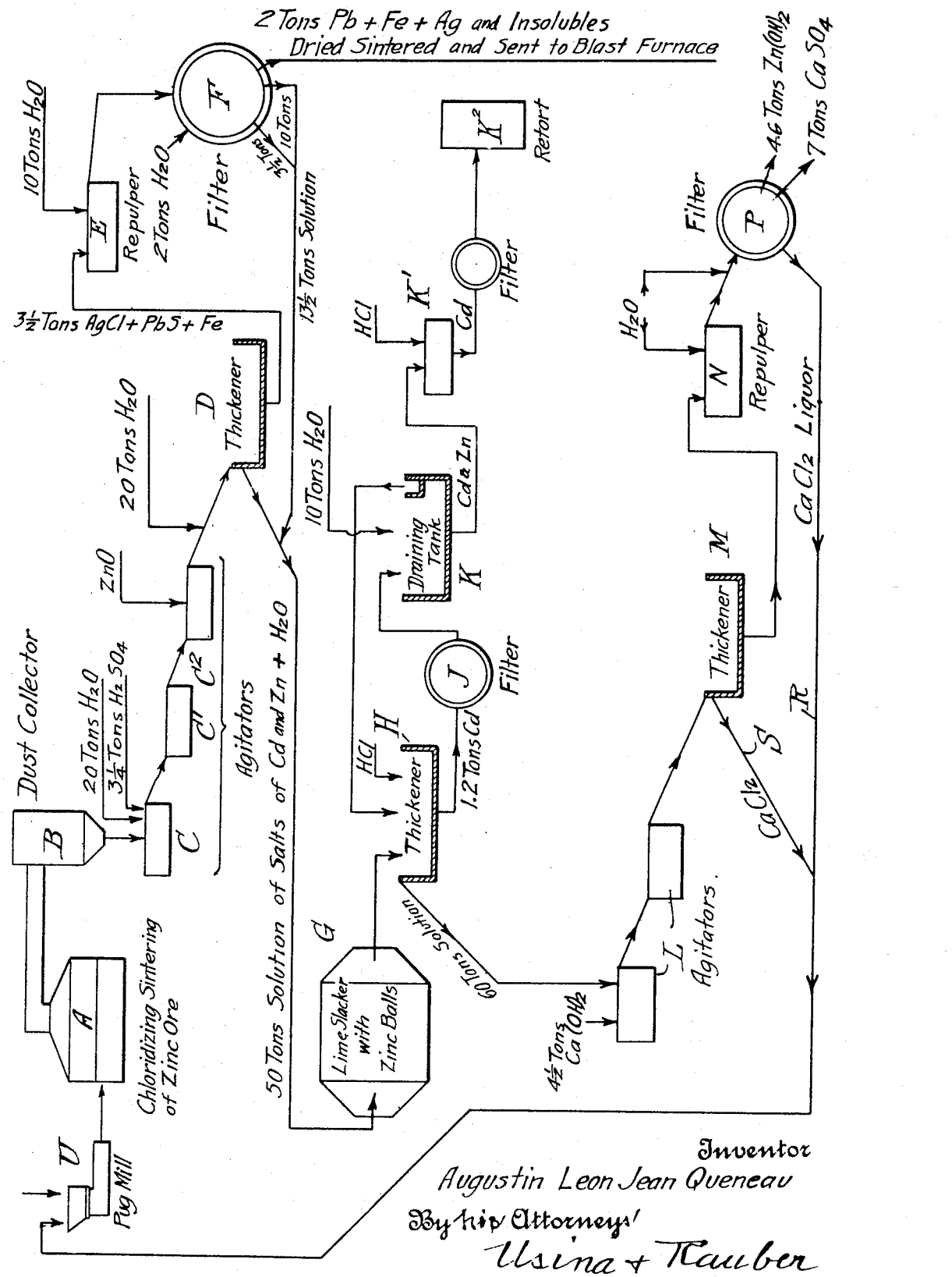

1,872,169

UNITED STATES PATENT OFFICE

AUGUSTIN LEON JEAN QUENEAU, OF NEW YORK, N. Y.

PROCESS FOR THE SEPARATION OF COMPONENT CONSTITUENTS OF A COMPLEX METALLIFEROUS DUST

Application filed June 7, 1929. Serial No. 369,234.

This invention relates to the recovery of the valuable component constituents of a complex dust or fume.

While not limited thereto the method is well suited to the treatment of dust or fume resulting from the method of purifying zinc ore disclosed in my copending application Serial No. 248,270, filed January 20, 1928.

Briefly stated the method of zinc ore treatment disclosed in said application involves mixing the ore with a chloridizing agent and subjecting the charge to a chloridizing blast roast or sintering step. The pre-roasted zinc ore is mixed with a small percentage (2½ to 3½%) of crushed carbonaceous fuel, high in fixed carbon, such as coke breeze, and mixed with a solution containing usually about 20 to 30%—(this varies according to the metallic contents of the ore under treatment)— of a chlorine compound, usually sodium or calcium chloride. Under the influence of the chemicals present, chlorine compound, steam, carbon and sulphur, the contaminating metals, such as lead, silver, cadmium, etc., are quantitatively removed and are carried away in the resulting gases as fume or fine dust particles of sulphates, or chlorides, or oxides. These compounds are separated from the gases by suitable known methods, such as electrical precipitation or filtration through textile fabrics, etc.

The present invention is related to the method disclosed in the above mentioned application and aims to extract from the collected dust the various metallic compounds separately and in a state of purity; thus lead and silver are collected together as lead sulphate and silver chloride; cadmium as metallic cadmium dust; and zinc oxide mixed with calcium sulphate.

The invention will be fully apparent to those skilled in the art from the following specification when read in connection with the accompanying drawing.

The single figure is a diagrammatic view or flow sheet illustrating the various steps in the method, suitable legends being applied to enable one to quickly grasp the essentials of the invention.

In the following description and in the accompanying diagram reference is made to definite quantities of materials added or treated and recovered during various steps of the process. The quantities referred to are approximately accurate and correspond closely to the quantities handled in a plant where the invention has been reduced to actual practice. However, it is to be understood that reference to such quantities is merely illustrative, it being understood that the proportion of the various ingredients used will vary in accordance with the characteristics of the particular grade of ore being treated.

Referring in detail to the diagram the ore to be treated is mixed with crushed carbonaceous fuel and a chlorine compound and fed to the sintering machine A. Here the charge is subjected to a chloridizing blast at a high temperature (around 1000° C.). This chloridizing blast with the assistance of the chemicals present (chlorine compound, steam, carbon, sulphur, etc.) drives off the contaminating metals such as lead, silver, cadmium and iron and some zinc in the form of fume or dust particles of sulphates, chlorides or oxides. The fume from the sintering machine A is passed to a suitable separating apparatus B such as a Cottrell precipitator where the compounds in the form of finely divided solids are separated from the volatile or gaseous products issuing from the sintering machine. A charge of about 10 tons of collected dust-like compounds is mixed in an agitator C with sufficient water (say about 20 tons) to make a smooth slurry. About 3¼ tons of sulphuric acid is added in the agitator C so as to bring all the soluble compounds into solution. This solution is passed through agitators C' and C², a temperature of about 70° C, being maintained during the agitation. This treatment immediately precipitates silver as silver chloride and lead as lead sulphate.

A small quantity of zinc oxide is added to the agitator C² to insure the precipitation of iron oxide.

The solution from agitator C² is passed to a thickener D with an addition of about 20 tons of water. The heavier product of the thickener containing silver, lead and iron is fed to a re-pulper E where about 20 tons of water is added. From the re-pulper E the mixture goes to a filter F. Here 2 tons of silver, lead and iron are recovered as a composite mixture, the lead being in the form of lead sulphate, the silver in the form of silver chloride and the iron in the form of iron oxide. After drying the mixture, the lead sulphate with its silver contents is treated on a sintering machine and the resulting sinter is sent to the usual blast furnace for the production of lead and silver bullion.

The filtrate from the filter F contains salts of cadmium and zinc. This solution amounting to about 13½ tons is fed, with the clear solution from the thickener D (which solution also contains similar salts) to a tube mill G. This tube mill is loaded with zinc balls which react with the solution to effect a complete precipitation of cadmium, an equivalent weight of zinc going into solution. A temperature of approximately 20° C is maintained in the tube mill and the material is held for about one hour therein.

From the tube mill G the effluent sludge is passed to a thickener H and a filter J and draining tank K where about 1.2 tons of cadmium is collected and washed.

The wet cadmium and a small percentage of zinc recovered from the filter J and tank K is agitated in a tank K' with a solution of hydrochloric acid which preferentially dissolves the zinc contents. The agitation is continued in tank until neutralization takes place and the thus purified cadmium sludge is filtered and washed. The resulting filter cake is mixed with a small quantity of fine anthracite coal and briquetted.

These cadmium briquettes are treated in graphite retorts in a suitable furnace $K^2$. For example a Faber du Faur furnace such as used in the distillation of silver-zinc-crust may be employed. A furnace temperature of above 778° C. is maintained so as to volatilize the cadmium. The cadmium vapors are condensed in the usual condensers, the cadmium is then cast into a crude ingot which is in turn remelted under tallow and finally cast to form the usual commercial sticks.

The clear filtrate from the thickener H (about 60 tons) is passed to the tanks L having agitators therein. Here about 4½ tons of milk of lime, $Ca(OH)_2$ is added at a temperature of about 90° C. A precipitate is thus formed containing the whole of the zinc as zinc hydrate $Zn(OH)_2$ and the sulphate radical as calcium sulphate $(CaSO_4)$. This precipitate is passed to a thickener M and through a re-pulper N whence it is washed and passed to filter P where about 4.16 tons of zinc hydrate and about 7 tons of calcium sulphate $(CaSO_4)$ are recovered. Instead of adding milk of lime to the filtrate in tank L, I may substitute calcium carbonate.

The washed filter cake of mixed zinc hydrate and calcium sulphate is dried, disintegrated and returned to the zinc sintering plant, where it is mixed in any desired portion with the pre-roasted zinc ore and sintered. The sinter is then sent to the usual zinc retorting furnaces.

The clean filtrate from the filter P and the clarified solution from the thickener M contain the original chlorine contents of the dust or fume originally fed from the separator B, associated with the chloridizing, sintering machine A, said chlorine contents now being in the form of calcium chloride and the solution is free from lead, silver, copper, zinc or cadmium. This solution contains about 10% by weight of calcium chloride.

As indicated by the lines R, and S on the flow diagram this material is conveyed to the pug mill U which is used to prepare the charge for the sintering machine A. Here any required addition of strong calcium chloride can be readily made. It is noted that the chlorine works in a continuous cycle through the system.

While I have described quite specifically the various steps of my improved method and have referred to definite quantities of materials used it is to be understood that I am not limited thereto. The detailed description is to be interpreted in an illustrative rather than a limiting sense, since various modifications may be made by skilled chemists or metallurgists without departing from the invention as defined in the appended claims.

What I claim is:

1. The method of treating zinc ores to recover the associated metal values thereof which comprises chloridizing said ore to convert the said metal values to metal chloride compounds, volatilizing said chloride compounds, leaching the volatilized chloride compounds with dilute sulfuric acid, removing therefrom the insolubles, treating the filtrate with metallic zinc to effect a precipitation of metallic cadmium, removing the cadmium, and treating the filtrate with basic calcium compounds to recover the zinc content thereof.

2. The method of treating zinc ores to recover the associated lead, silver, and cadmium values thereof which comprises converting the values to metal chloride compounds, vaporizing and collecting the same substantially free of the ore gangue, leaching the chloride compounds with dilute sulfuric acid, removing the precipitated silver and lead compounds, treating the filtrate with metallic zinc to effect a precipitation of the cadmium, removing the cadmium and treating the filtrate with basic calcium compounds to effect a precipitation of the zinc.

3. In the method of treating zinc ores to recover the associated metal values thereof comprising the steps of chloridizing said values, volatilizing the chloride compounds, leaching the volatilized chlorides with dilute sulfuric acid, removing therefrom the precipitated silver and lead values, treating the filtrate with metallic zinc to effect a precipitation of metallic cadmium, removing the cadmium, and treating the filtrate with basic calcium compounds to recover the zinc content thereof, the step of returning the final filtrate at least in part to the chloridizing step to be utilized therein.

4. The method of separating the metal values in an admixture of zinc, cadmium, lead, silver and iron chloride compounds which comprises first leaching the chloride admixture with dilute sulfuric acid to remove therefrom the soluble zinc and cadmium compounds, filtering off the insoluble lead, silver and iron compounds, second, treating the filtrate with metallic zinc to effect a separation therefrom of metallic cadmium; filtering out the precipitated cadmium, and thereafter precipitating the zinc content of the filtrate with basic calcium compounds, and washing and recovering the same.

5. The method of recovering cadmium in a substantially pure state from admixed lead, silver, zinc and cadmium chlorides, which comprises leaching the admixed chlorides with dilute sulfuric acid to effect a separation of the lead and silver, filtering and treating the filtrate with metallic zinc to precipitate the cadmium content thereof, removing the cadmium precipitate, digesting the same with dilute hydrochloric acid, recovering the purified cadmium precipitate, admixing with carbonaceous material briquetting and heating to approximately 778° C. to distill the cadmium, thereafter recovering the vaporized purified cadmium in any convenient manner.

In witness whereof, I have hereunto signed my name.

AUGUSTIN LEON JEAN QUENEAU.